United States Patent
Babaoglu et al.

(10) Patent No.: US 10,841,192 B1
(45) Date of Patent: Nov. 17, 2020

(54) ESTIMATING DATA TRANSFER PERFORMANCE IMPROVEMENT THAT IS EXPECTED TO BE ACHIEVED BY A NETWORK OPTIMIZATION DEVICE

(71) Applicant: Riverbed Technology, Inc., San Francisco, CA (US)

(72) Inventors: Ahmet Can Babaoglu, San Jose, CA (US); Kand Ly, San Francisco, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 0 days.

(21) Appl. No.: 16/202,560

(22) Filed: Nov. 28, 2018

Related U.S. Application Data

(60) Provisional application No. 62/592,298, filed on Nov. 29, 2017.

(51) Int. Cl.
*H04L 12/26* (2006.01)
*H04L 12/24* (2006.01)

(52) U.S. Cl.
CPC ........ *H04L 43/0888* (2013.01); *H04L 41/083* (2013.01); *H04L 41/16* (2013.01); *H04L 43/04* (2013.01); *H04L 43/0841* (2013.01); *H04L 43/0864* (2013.01)

(58) Field of Classification Search
None
See application file for complete search history.

(56) References Cited

U.S. PATENT DOCUMENTS

| | | | | |
|---|---|---|---|---|
| 8,018,866 B1 * | 9/2011 | Kasturi | ............... | H04L 41/5025 370/230.1 |
| 8,024,483 B1 * | 9/2011 | Rothstein | ................ | H04L 69/04 709/247 |
| 8,520,535 B2 * | 8/2013 | Dawson | ................ | H04W 48/18 370/252 |
| 8,739,244 B1 * | 5/2014 | Wu | ..................... | H04L 67/2847 726/2 |
| 2006/0212935 A1 * | 9/2006 | Burman | ............. | H04L 67/2842 726/12 |
| 2010/0128623 A1 * | 5/2010 | Dunn | ...................... | H04L 41/12 370/252 |

(Continued)

*Primary Examiner* — Sithu Ko
(74) *Attorney, Agent, or Firm* — Park, Vaughan, Fleming & Dowler LLP; Laxman Sahasrabuddhe

(57) ABSTRACT

Systems and techniques are described for calculating performance improvement achieved and/or expected to be achieved by optimizing a network connection. Network characteristics can be measured for non-optimized network connections. Next, the network characteristics can be analyzed to obtain a set of non-optimized connection groups, wherein each non-optimized connection group corresponds to non-optimized network connections that have similar network characteristics. Network characteristics for an optimized network connection can be measured. Next, a non-optimized connection group can be identified based on the network characteristics that were measured for the optimized network connection. A performance improvement metric can then be calculated based on a throughput of the optimized network connection and corresponding throughputs of non-optimized network connections in the identified non-optimized connection group.

18 Claims, 3 Drawing Sheets

(56) References Cited

U.S. PATENT DOCUMENTS

| | | | | |
|---|---|---|---|---|
| 2010/0154044 A1* | 6/2010 | Manku | H04L | 67/327 |
| | | | | 726/7 |
| 2010/0211673 A1* | 8/2010 | Kosbab | H04L | 41/5009 |
| | | | | 709/224 |
| 2012/0188949 A1* | 7/2012 | Salkintzis | H04L | 45/308 |
| | | | | 370/329 |
| 2012/0197965 A1* | 8/2012 | McCanne | H04L | 67/108 |
| | | | | 709/202 |
| 2012/0290687 A1* | 11/2012 | Callaway | G06F | 9/00 |
| | | | | 709/219 |
| 2013/0121209 A1* | 5/2013 | Padmanabhan | H04L | 41/0803 |
| | | | | 370/255 |
| 2013/0136067 A1* | 5/2013 | Praveenkumar | H04W | 76/16 |
| | | | | 370/329 |
| 2013/0173756 A1* | 7/2013 | Luna | H04L | 67/2828 |
| | | | | 709/219 |
| 2013/0185388 A1* | 7/2013 | Mackie | H04L | 67/06 |
| | | | | 709/217 |
| 2013/0263167 A1* | 10/2013 | Parthasarathy | H04L | 41/5067 |
| | | | | 725/14 |
| 2015/0012250 A1* | 1/2015 | Li | G05B | 17/02 |
| | | | | 703/2 |
| 2015/0295787 A1* | 10/2015 | Kakadia | H04L | 43/062 |
| | | | | 370/236 |
| 2015/0333969 A1* | 11/2015 | Vasseur | H04L | 41/5025 |
| | | | | 709/224 |
| 2016/0381580 A1* | 12/2016 | Kwan | H04L | 41/5009 |
| | | | | 370/252 |
| 2017/0171045 A1* | 6/2017 | Ly | H04L | 67/2819 |
| 2018/0248762 A1* | 8/2018 | Freimuth | H04L | 43/0829 |

* cited by examiner

ESTIMATING DATA TRANSFER PERFORMANCE IMPROVEMENT THAT IS EXPECTED TO BE ACHIEVED BY A NETWORK OPTIMIZATION DEVICE

RELATED APPLICATION

This application claims benefit of U.S. Provisional Patent Application No. 62/592,298, entitled "METHODS FOR MEASURING DATA TRANSFER PERFORMANCE IMPROVEMENT ACHIEVED BY A WAN OPTIMIZER USING DISPARATE MEASUREMENTS AND MACHINE LEARNING," by the same inventors, filed on 29 Nov. 2017, the contents of which are herein incorporated by reference in their entirety for all purposes.

BACKGROUND

The present disclosure generally relates to estimating data transfer performance improvement. More specifically, the present disclosure relates to using disparate measurements and machine learning to estimate data transfer performance improvement that is achieved and/or expected to be achieved by a network optimization device.

According to one definition, a computer is any device that is capable of performing computations, and a data communication network (or "network" for short) is an interconnection of one or more devices that is capable of delivering information from one computer to another computer. Examples of networks include, but are not limited to, wireless and wired networks, local area networks (LANs), metropolitan area networks (MANs), WANs, private networks, public networks, intranets, internets, etc. Data communication networks often include a variety of network devices for sending, receiving, directing, and optimizing network data traffic.

Enterprise networks can include one or more WANs that interconnect offices that can be distributed over a large geographical area. Improving performance of the enterprise network is important because it improves productivity, which in turn increases profitability of the organization. Some enterprise networks use WAN optimization devices to improve network performance. WAN optimization devices optimize network traffic to improve WAN performance in reading and/or writing data over a network. WAN optimization devices typically compress data (e.g., by performing de-duplication) and perform other optimization tasks (e.g., caching, prefetching, etc.) to improve WAN performance.

WAN optimization devices may operate singly or in pairs at each side of a WAN connection to optimize network traffic. WAN optimization devices are referred to in the art by many different terms, including, but not limited to, transaction accelerators, WAN optimizers, WAN optimization controllers (WOCs), wide-area data services (WDS) appliances, WAN traffic optimizers (WTOs), and protocol accelerators or optimizers.

Techniques for optimizing network traffic to improve network performance in reading and/or writing data over a network are referred to in the art by many different terms, including, but not limited to, WAN acceleration, transaction acceleration, transaction pipelining, protocol pipelining, request prediction, application flow acceleration, and protocol acceleration. In this disclosure, the term "WAN optimization device" is used to refer to such devices and applications and "WAN optimization" is used to refer to such techniques.

An enterprise needs to estimate the improvement that a WAN optimizer can achieve in order to decide whether or not to deploy WAN optimization devices in its network. Currently, there are no accurate and convenient techniques for estimating the improvement gain that one can reasonably expect from deploying WAN optimization devices in a network.

One approach measures the data transfer rate in a network without optimization, and then measures the data transfer rate again for the same network traffic with optimization. This approach requires the data transfer to be repeated using the same client/server and data. Such manual approaches can work in experimental setups, but they do not work in production systems where the network administrators and users do not want to disrupt the normal operation of the network just to know how much improvement can be expected from WAN optimization devices. Due to these practical difficulties, some WAN optimization vendors and customers use mathematical models to predict the improvement, but these models are inaccurate because they include many assumptions about the traffic and network, which are often not valid.

Therefore, what are required are techniques and systems for estimating performance improvement that is achieved and/or expected to be achieved by a network optimization device without the above-described drawbacks.

SUMMARY

Some embodiments described herein provide systems and techniques for estimating performance improvement that is achieved and/or expected to be achieved when a network connection is optimized. Some embodiments can measure network characteristics for non-optimized network connections (one or more network characteristics can be measured for each non-optimized network connection), and store the measured network characteristics in a storage device for later analysis. Next, the embodiments can analyze the measured network characteristics to obtain a set of non-optimized connection groups, wherein each non-optimized connection group corresponds to non-optimized network connections that have similar network characteristics. In general, a machine learning or a data analytic technique that categorizes elements into groups based on similar attribute values can be used to perform the analysis. In particular, multivariable clustering can be used to perform the analysis.

Next, the embodiments can measure network characteristics for an optimized network connection (one or more network characteristics can be measured for the optimized network connection). The embodiments can then identify a non-optimized connection group based on the network characteristics that were measured for the optimized network connection. In some embodiments, the same technique that was used for grouping non-optimized network connections is used to identify which non-optimized connection group the optimized network connection most closely resembles. Next, the embodiments can calculate a performance improvement metric based on a throughput of the optimized network connection and corresponding throughputs of non-optimized network connections in the identified non-optimized connection group. In some embodiments, the performance improvement metric can be calculated by dividing the throughput of the optimized network connection by an average (or another statistic, e.g., median) of the corresponding throughputs of non-optimized network connections.

A network characteristic can generally be any measurable property of a network connection that can be used to characterize the network connection. Examples of network characteristics include, but are not limited to, connection start time, connection end time, source internet protocol (IP) address, destination IP address, destination port, application name or identifier, byte volume, round trip time (RTT), or packet loss.

In some embodiments, throughput of a network connection is measured during a time period when a data rate of the network connection is greater than a threshold. Some embodiments can calculate an overall performance improvement metric for a network by calculating an average performance improvement metric across a plurality of optimized network connections in the network. Some embodiments can calculate an overall performance improvement metric for a given network characteristic by calculating an average performance improvement metric across a plurality of optimized network connections in the network that have the same network characteristic (e.g., average performance improvement for a particular application across the network).

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein. In this disclosure, when the term "and/or" is used with a list of entities, it refers to all possible combinations of the list of entities. For example, the phrase "X, Y, and/or Z" covers the following cases: (1) only X; (2) only Y; (3) only Z; (4) X and Y; (5) X and Z; (6) Y and Z; and (7) X, Y, and Z. Additionally, in this disclosure, the term "based on" means "based solely or partially on."

Figure 1:
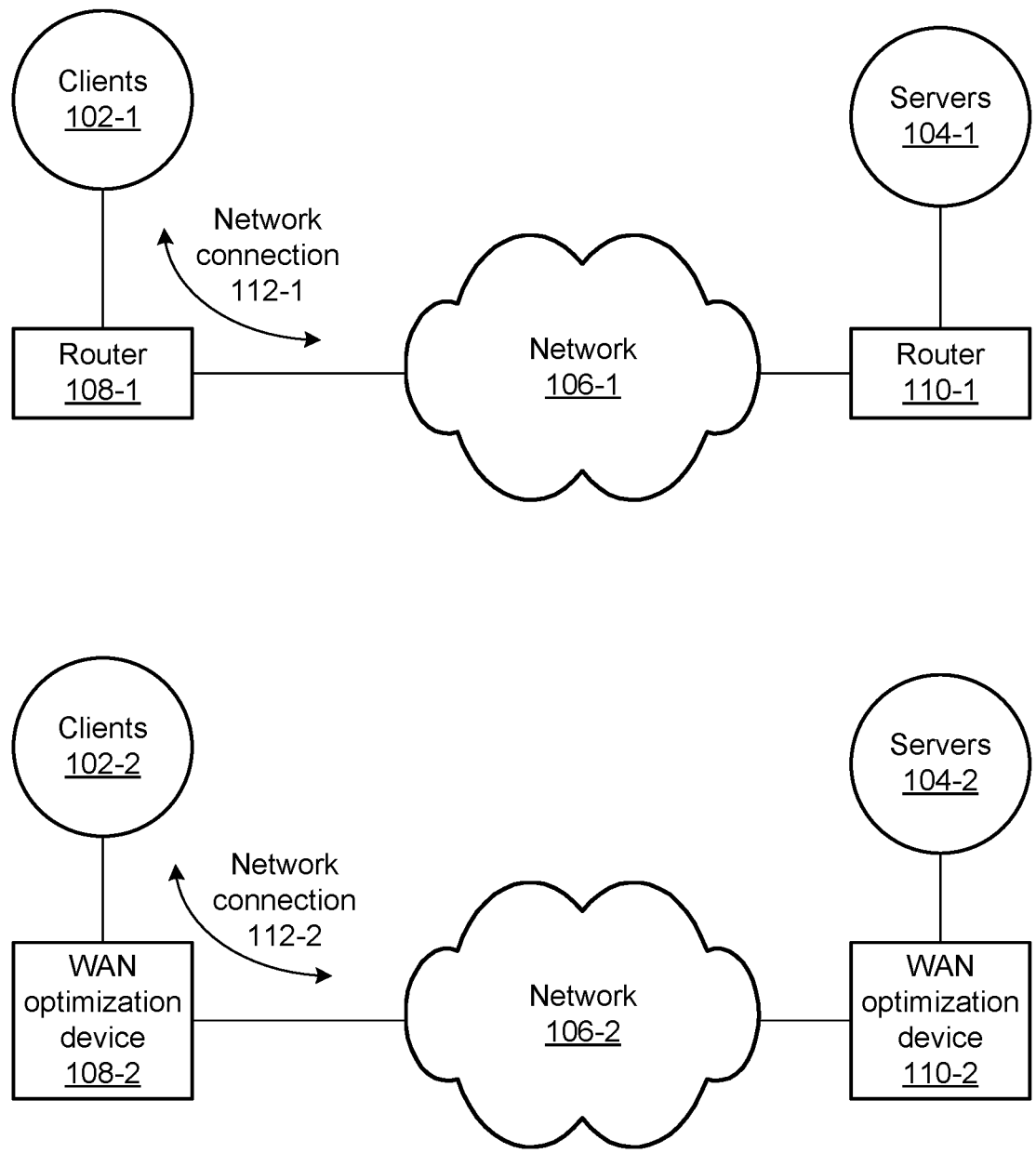
FIG. 1 illustrates an example of a network in accordance with some embodiments described herein.

FIG. 1 illustrates an example of a network in accordance with some embodiments described herein. Networks 106-1 and 106-2 can enable computers to communicate with each other. Network traffic between clients 102-1 and servers 104-1 can be sent over network connection 112-1, and pass through router 108-1, network 106-1, and router 110-1. Likewise, network traffic between clients 102-2 and servers 104-2 can be sent over network connection 112-2, and pass through WAN optimization device 108-2, network 106-2, and WAN optimization device 110-2.

In FIG. 1, routers 108-1 and 110-1 route network traffic without optimization, whereas WAN optimization devices 108-2 and 110-2 optimize the network traffic passing through them. Specifically, WAN optimization device 108-2 can establish a connection with WAN optimization device 110-2, and can use this connection to optimize at least some communications between clients 102-2 and servers 104-2. For example, WAN optimization devices 108-2 and 110-2 can transparently intercept a client-server connection and establish three connections: a first connection between a client and WAN optimization device 108-2, a second connection between the two WAN optimization devices, and a third connection between a server and WAN optimization device 110-2. Next, each WAN optimization device can de-duplicate and/or compress the data that is being sent to the other WAN optimization device. In addition to decreasing the amount of bandwidth required for communicating data over the WAN network connection, the WAN optimization devices can also reduce latency by, for example, performing intelligent prefetching. In this disclosure, the performance improvement is measured in terms of the increase in throughput that is achieved and/or expected to be achieved by WAN optimization devices as a result of one or more WAN optimization techniques, including, but not limited to, compression, de-duplication, latency optimization, etc. The number and types of devices shown in FIG. 1 are for illustration purposes only and are not intended to limit the scope of this disclosure.

Some embodiments described in this disclosure use machine learning to determine which non-optimized connections are equivalent to optimized connections so that we can infer the non-optimized throughput that an optimized connection would have experienced, and use that information to calculate the performance improvement. In this disclosure, the end-user experience improvement is not being calculated; instead, what is being calculated is the throughout performance improvement the WAN optimization device achieves and/or is expected to achieve when a significant data transfer occurs. The throughput improvement may or may not translate into an equivalent end-user experience improvement because other factors can affect the end-user experience, such as the software that is used to render the data being slow, or the end-user machine being slow. Nonetheless, estimating the performance improvement for large data transfers can give customers a sense of the value of deploying the optimization device in terms of an accurate and realistic performance improvement metric.

Some embodiments described in this disclosure perform the following steps: (1) detect, on the fly, significant data transfers for non-optimized connections and measure their throughput as well as their characteristics like start time, end time, client IP address, server IP address, server TCP port, application, byte volume, RTT, packet loss on the client-side; (2) collect the data transfer measurements and store them in a storage device for analysis; (3) use multivariable clustering or another suitable machine learning and data analytics technique to find groups of data transfers that are correlated based on the collected network characteristics, e.g., the same client/server/app that experiences the same throughput at a certain time of day or for a certain RTT; (4) measure client-side LAN throughput for optimized data transfers and figure out their corresponding non-optimized data transfer group using the characteristics that define a group; (5) calculate the speed increase between the optimized throughput and the throughput of the corresponding non-optimized group; and (6) use further calculation to get the performance improvement globally, per application, per server, per client, or based on other characteristics.

Using multivariable clustering enables the embodiments to group together non-optimized connections that have similar network characteristics, which increases the accuracy of the performance improvement calculation. For example, if connections for application 1 behave the same way in terms of throughput and pattern as connections for application 2 at a certain site and if at another site application 1 is optimized but application 2 is non-optimized, then we can compare the optimized throughput of application 1 to the non-optimized throughput of application 2 if the multivariate clustering technique indicates that those two connections have been clustered in the same connection group. As another example, if we have data transfer results for connections between different clients going to the same server but one of the client is not optimized for some reason, even if they are transferring different data, clustering might tell us that the throughput experienced by the non-optimized client would be the same as the one the optimized client would experience if its connection was not optimized based on data between the same clients and other servers.

Once the data transfer throughput results have been appropriately grouped, we can then calculate the average throughput for optimized and non-optimized connections to obtain a global performance improvement ratio. Alternatively, we can calculate a performance improvement ratio that is broken down by application, location, client/server, or other categories. Note that the clustering algorithm can indicate how accurate the model is, and this information can be used to filter out measurements that don't have an accurate match to a non-optimized group. The model accuracy information can also be provided to the user, so that the user knows how accurate the performance improvement number is. If the model depends on a certain characteristic and we don't have the equivalent non-optimized group for that characteristic, but we have other data points, then regression can be used to calculate an intermediate estimated throughput to use to compare with the optimized throughput. The embodiment can also decide to not optimize some traffic to prime the estimation model, or to enhance the estimation model when sufficient data is not available for a comparable non-optimized throughput. The embodiment may allow the end user to turn on or turn off this feature.

If required, synthetic traffic can be simulated between client/server side WAN optimization devices. The synthetic traffic can be made specific to protocol blades—e.g., Hyper-Text Transfer Protocol (HTTP), Messaging Application Programming Interface (MAPI), etc.—and it can help provide a basic idea about the network conditions with and without WAN optimization. The synthetic traffic based approach has the advantage of being "controlled data," i.e., only a small amount of data needs to be simulated to measure the performance improvement. However, the disadvantage of this approach is that the simulated traffic may not have the same characteristics as the actual customer traffic. In some embodiments, non-optimized measurements across multiple customers can also be used for the calculations.

As mentioned above, it is important to measure throughput when significant data transfers are taking place. Specifically, an HTTP connection may perform a data transfer and then stay idle (or transfer very little data) for a while, e.g., send short keep-alive or command/result messages, and then again do some other data transfer. To obtain an accurate measurement of the performance improvement, it is important to measure the throughput of the HTTP connection during the data transfers and not during the idle period when the short keep-alive messages are being sent. Customers typically do not care about the performance improvement for such short messages, and if throughput is used for clustering purposes, then measuring throughput during such idle or low throughput phases of the network connection can fool the clustering algorithm. Therefore, some embodiments can sample cumulative bytes periodically in conjunction with thresholds to detect when a "significant data blob" is being transferred over the network connection. A meaningful threshold (e.g., greater than 100 KB in 1 sec for a given time window) should detect a user-perceivable data transfer. When this threshold condition is met, then the throughput measurement is used in the clustering algorithm and/or performance improvement calculations. The specific threshold that is used can be either set to a fixed value, or it can be adjusted based on LAN/WAN side bandwidth or RTTs. The start and respectively the end of a data blob could be determined by the number of bytes in a period being above and respectively below the threshold for multiple consecutive sampling periods. There could also be multiple such data blobs in the same connection.

Approaches for estimating performance improvement described herein have multiple advantages because (1) they are more realistic because they rely on real measurement data, (2) they use customer traffic and are network specific so the estimate is based on the customer's own network and application traffic conditions, (3) they are simpler because they do not rely on trying to calculate what the transfer time would have been if the connection was not optimized, (4) the measurements are independent of the application and protocol used by the client/server, (5) does not require unnecessary calculations or assumptions, and (6) the approaches are self-updating because new non-optimized measurements will update both the clustering model and the estimated throughput.

Figure 2:
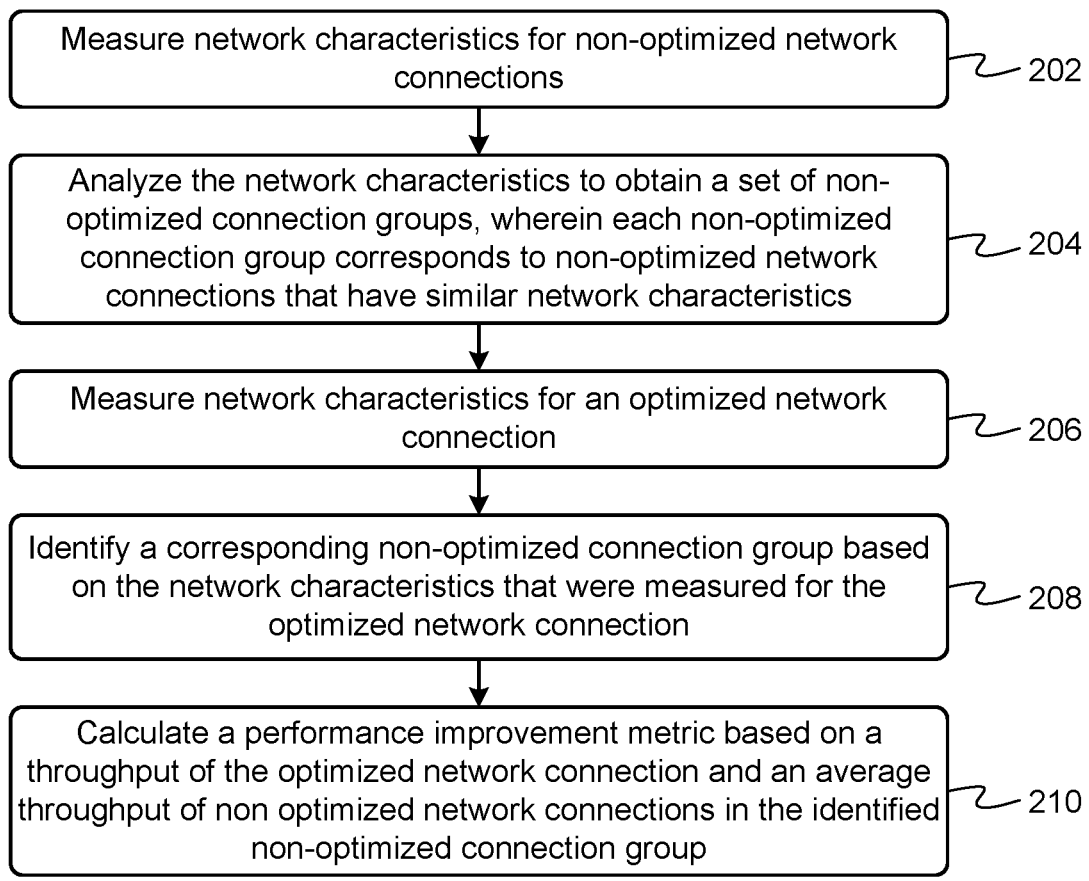
FIG. 2 illustrates a process for estimating performance improvement achieved and/or expected to be achieved by optimizing a network connection in accordance with some embodiments described herein.

FIG. 2 illustrates a process for estimating performance improvement achieved and/or expected to be achieved by optimizing a network connection in accordance with some embodiments described herein. The process can begin by measuring network characteristics for non-optimized network connections (step 202). Note that, one or more network characteristics can be measured for each non-optimized network connection. Network characteristics can include, but are not limited to, connection start time, connection end time, source internet protocol (IP) address, destination IP address, destination port, application name or identifier, byte volume, round trip time (RTT), and packet loss.

Next, the process can analyze the network characteristic measurements to obtain a set of non-optimized connection groups, wherein each non-optimized connection group corresponds to non-optimized network connections that have similar network characteristics (step 204). In general, step 204 can use a machine learning or a data analytic technique that groups elements that have similar properties. In particular, step 204 can use multivariable clustering to determine the set of non-optimized connection groups such that each non-optimized connection group corresponds to non-optimized network connections that have similar network characteristics.

The process can then measure network characteristics for an optimized network connection (step 206). Specifically, one or more network characteristics can be measured for the optimized network connection. Next, the process can identify a corresponding non-optimized connection group based on the network characteristics that were measured for the optimized network connection (step 208).

The process can then calculate a performance improvement metric based on a throughput of the optimized network connection and corresponding throughputs of non-optimized network connections in the identified non optimized connection group (step 210). In some embodiments, the performance improvement metric can be calculated by dividing the throughput of the optimized network connection by an average (or another statistic, e.g., median) of the corresponding throughputs of non-optimized network connections. As mentioned previously, the throughput of a network connection can be measured during a time period when a data rate of the network connection is greater than a threshold. Additionally, the process can calculate an overall performance improvement metric for a network by calculating an average performance improvement metric across a plurality of optimized network connections in the network.

For example, in FIG. 1, if network connections 112-1 and 112-2 are determined to have similar network characteristics (based on performing steps 202, 204, 206, and 208), then, in step 210, the performance improvement can be calculated by dividing the throughput of network connection 112-2 (which carries optimized network traffic that passes through WAN optimization devices 108-2 and 110-2) by the throughput of network connection 112-1 (which carries non-optimized network traffic that passes through routers 108-1 and 110-1).

Figure 3:
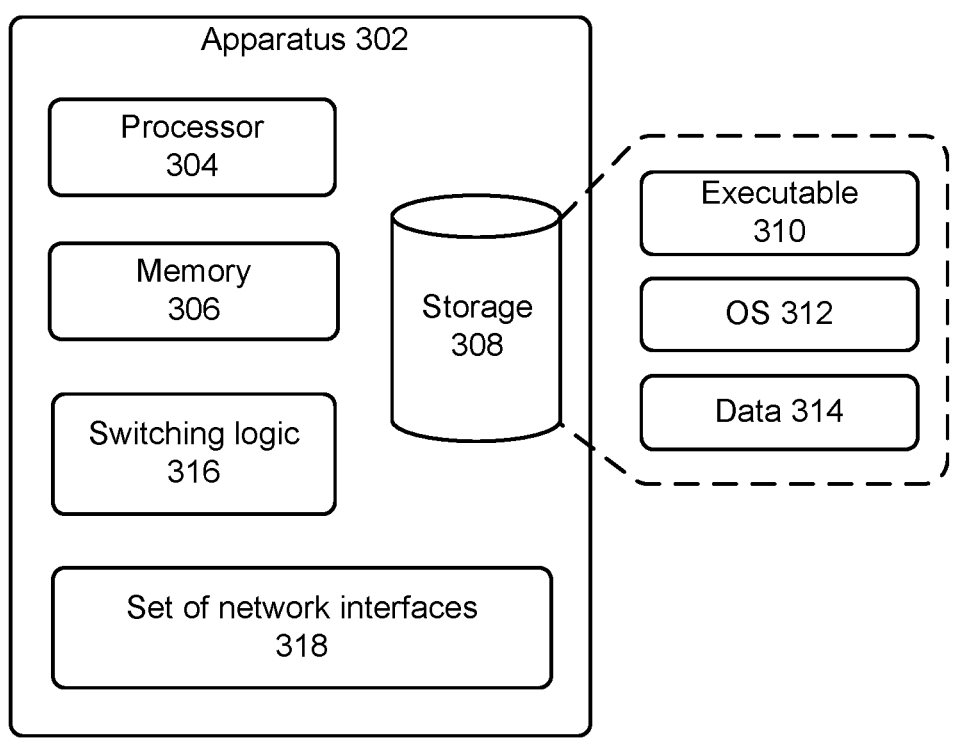
FIG. 3 illustrates an apparatus in accordance with some embodiments described herein.

FIG. 3 illustrates an apparatus in accordance with some embodiments described herein. Apparatus 302 (e.g., a computer, a client, a server, a router, a WAN optimization device, etc.) comprises processor 304, memory 306 (e.g., a volatile or non-volatile random access memory), and storage 308 (e.g., a flash memory device or a disk drive). Storage 308 can store executable 310, operating system 312, and data 314. The components in apparatus 302 can communicate with one another using a communication mechanism, e.g., a bus, a backplane, and/or a switching fabric. Executable 310 can include instructions that, when executed by processor 304, cause apparatus 302 to perform one or more methods that are implicitly or explicitly described in this disclosure. Data 314 can include any data that is inputted into or outputted by executable 310.

Apparatus 302 can also include switching logic 316 and set of network interfaces 318. Set of network interfaces 318 can be used to transmit data to and/or receive data from other communication devices. Switching logic 316 can forward network traffic received on one or more network interfaces in accordance with switching/forwarding/routing information stored in apparatus 302. Specifically, switching logic 316 can be configured by processor 304 in accordance with one or more methods that are implicitly or explicitly described in this disclosure.

The data structures and code described in this disclosure can be partially or fully stored on a non-transitory computer-readable storage medium and/or a hardware module and/or hardware apparatus. A non-transitory computer-readable storage medium includes all computer-readable storage mediums with the sole exception of a propagating electromagnetic wave or signal. Specifically, a non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules or apparatuses. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for estimating performance improvement that is achieved or that is expected to be achieved by optimizing a network connection, the method comprising:
   measuring first network characteristics for a set of network connections that are not optimized;
   analyzing the first network characteristics to obtain a set of connection groups, wherein each connection group corresponds to network connections that are not optimized and that have similar network characteristics;
   measuring second network characteristics for an optimized network connection that is not in the set of network connections;
   identifying a connection group corresponding to the optimized network connection based on the second network characteristics; and
   calculating, by a computer, a performance improvement metric based on a throughput of the optimized network connection and corresponding throughputs of network connections that belong to the identified connection group, wherein the performance improvement metric represents a throughput improvement expected in a particular network connection belonging to the identified connection group when the particular network connection is optimized.

2. The method of claim 1, wherein said analyzing the first network characteristics to obtain the set of connection groups compromises using multivariable clustering.

3. The method of claim 1, wherein said analyzing the first network characteristics to obtain the set of connection groups compromises using a machine learning or a data analytic technique that groups elements that have similar attributes.

4. The method of claim 1, wherein a network characteristic is one of: connection start time, connection end time, source internet protocol (IP) address, destination IP address, destination port, application name or identifier, byte volume, round trip time (RTT), and packet loss.

5. The method of claim 1, wherein throughput of a given network connection is measured during a time period when a data rate of the given network connection is greater than a threshold.

6. The method of claim 1, further comprising calculating an overall performance improvement metric for a network by calculating an average performance improvement metric over multiple network connections.

7. A non-transitory computer-readable storage medium storing instructions that, when executed by a computer, cause the computer to perform a method for estimating performance improvement that is achieved or that is expected to be achieved by optimizing a network connection, the method comprising:
   measuring first network characteristics for a set of network connections that are not optimized;

analyzing the first network characteristics to obtain a set of connection groups, wherein each connection group corresponds to network connections that are not optimized and that have similar network characteristics;

measuring second network characteristics for an optimized network connection that is not in the set of network connections;

identifying a connection group corresponding to the optimized network connection based on the second network characteristics; and calculating a performance improvement metric based on a throughput of the optimized network connection and corresponding throughputs of network connections that belong to the identified connection group, wherein the performance improvement metric represents a throughput improvement expected in a particular network connection belonging to the identified connection group when the particular network connection is optimized.

8. The non-transitory computer-readable storage medium of claim 7, wherein said analyzing the first network characteristics to obtain the set of connection groups compromises using multivariable clustering.

9. The non-transitory computer-readable storage medium of claim 7, wherein said analyzing the first network characteristics to obtain the set of connection groups compromises using a machine learning or a data analytic technique that groups elements that have similar attributes.

10. The non-transitory computer-readable storage medium of claim 7, wherein a network characteristic is one of: connection start time, connection end time, source internet protocol (IP) address, destination IP address, destination port, application name or identifier, byte volume, round trip time (RTT), and packet loss.

11. The non-transitory computer-readable storage medium of claim 7, wherein throughput of a given network connection is measured during a time period when a data rate of the given network connection is greater than a threshold.

12. The non-transitory computer-readable storage medium of claim 7, further comprising calculating an overall performance improvement metric for a network by calculating an average performance improvement metric over multiple network connections.

13. An apparatus, comprising:
a processor; and
a non-transitory computer-readable storage medium storing instructions that, when executed by the processor, cause the processor to perform a method for estimating performance improvement that is achieved or that is expected to be achieved by optimizing a network connection, the method comprising:

measuring first network characteristics for a set of network connections that are not optimized;

analyzing the first network characteristics to obtain a set of connection groups, wherein each connection group corresponds to network connections that are not optimized and that have similar network characteristics;

measuring second network characteristics for an optimized network connection that is not in the set of network connections;

identifying a connection group corresponding to the optimized network connection based on the second network characteristics; and calculating a performance improvement metric based on a throughput of the optimized network connection and corresponding throughputs of network connections that belong to the identified connection group, wherein the performance improvement metric represents a throughput improvement expected in a particular network connection belonging to the identified connection group when the particular network connection is optimized.

14. The apparatus of claim 13, wherein said analyzing the first network characteristics to obtain the set of connection groups compromises using multivariable clustering.

15. The apparatus of claim 13, wherein said analyzing the first network characteristics to obtain the set of connection groups compromises using a machine learning or a data analytic technique that groups elements that have similar attributes.

16. The apparatus of claim 13, wherein a network characteristic is one of: connection start time, connection end time, source internet protocol (IP) address, destination IP address, destination port, application name or identifier, byte volume, round trip time (RTT), and packet loss.

17. The apparatus of claim 13, wherein throughput of a given network connection is measured during a time period when a data rate of the given network connection is greater than a threshold.

18. The apparatus of claim 13, further comprising calculating an overall performance improvement metric for a network by calculating an average performance improvement metric over multiple network connections.

* * * * *